United States Patent [19]
Witte

[11] 4,325,604
[45] Apr. 20, 1982

[54] INPUT AND OUTPUT COUPLER DEVICE

[75] Inventor: Hans-H. Witte, Munich, Fed. Rep. of Germany

[73] Assignee: Siemens Aktiengesellschaft, Berlin and Munich, Fed. Rep. of Germany

[21] Appl. No.: 68,218

[22] Filed: Aug. 20, 1979

[30] Foreign Application Priority Data

Sep. 28, 1978 [DE] Fed. Rep. of Germany ....... 2842276

[51] Int. Cl.³ .............................................. G02B 5/14
[52] U.S. Cl. ............................... 350/96.15; 350/96.33
[58] Field of Search .............. 350/96.15, 96.30, 96.33, 350/96.34

[56] References Cited

U.S. PATENT DOCUMENTS

| | | | |
|---|---|---|---|
| 4,135,779 | 1/1979 | Hudson | 350/96.15 |
| 4,150,870 | 4/1979 | Auria | 350/96.16 |
| 4,164,364 | 8/1979 | Witte | 350/96.16 |
| 4,165,496 | 8/1979 | Di Domenico et al. | 350/96.15 |

FOREIGN PATENT DOCUMENTS 2625855 12/1977 Fed. Rep. of Germany .

*Primary Examiner*—John K. Corbin
*Assistant Examiner*—Rodney Bovernick
*Attorney, Agent, or Firm*—Hill, Van Santen, Steadman, Chiara & Simpson

[57] ABSTRACT

A coupler device for use with light conducting fibers to couple-out and couple-in a light signal to the fibers comprises at least three optical fibers and a physical structure for holding the fibers in a plane with the first and second fibers converging together to have a portion of each of the fibers adjacent the end faces extending in parallel side-by-side relationship with the end faces being flush and the end face of the third fiber being positioned in abutting relationship against the end faces of the first and second fibers. In one embodiment, the amount of offset between the third fiber and the pair of first and second fibers is adjustable so that the coupler can be changed from a direct coupler of one of the first and second fibers being directly coupled to the third fiber to a branching coupler with the third fiber being connected to both the first and second fibers.

9 Claims, 2 Drawing Figures

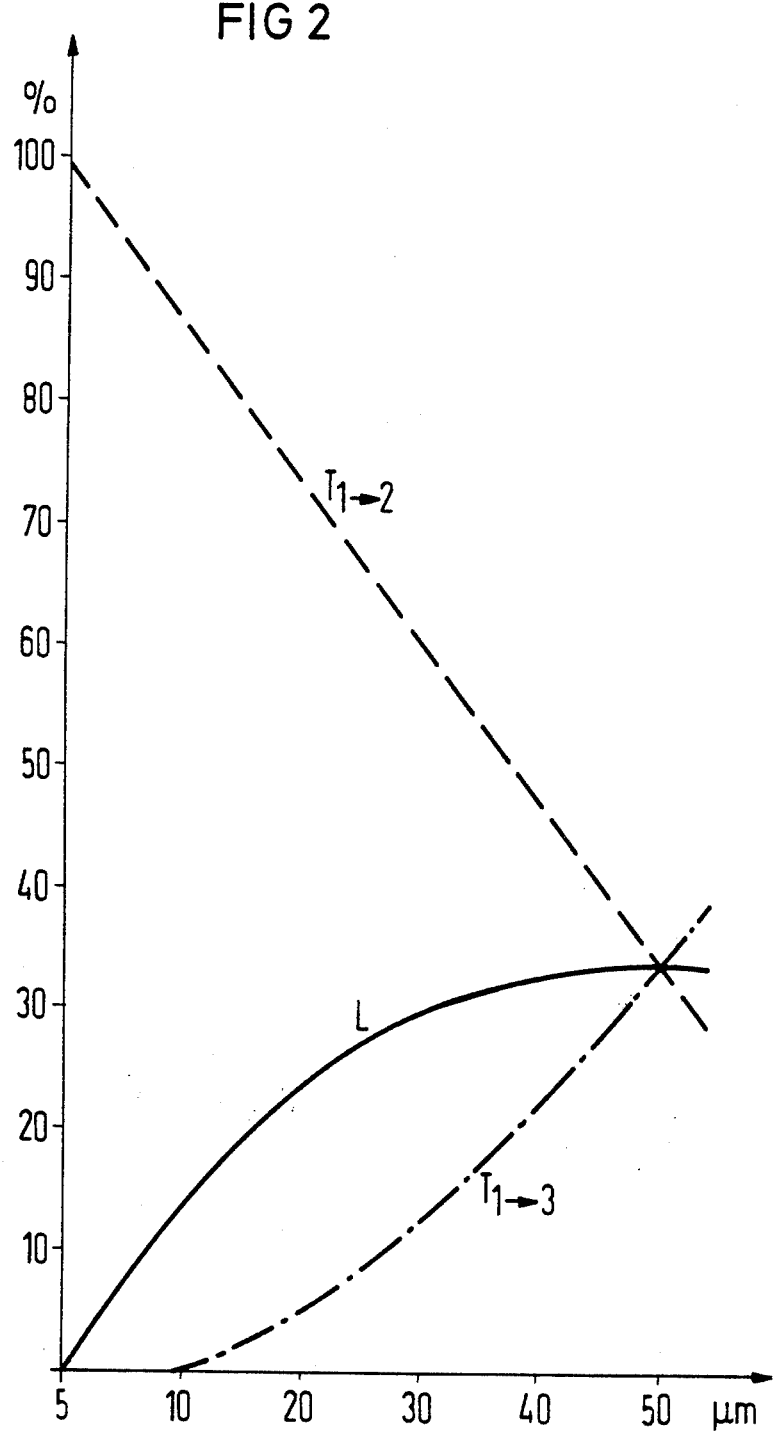

INPUT AND OUTPUT COUPLER DEVICE

BACKGROUND OF THE INVENTION

The present invention is directed to an output and/or input coupler for optical fibers such as light conducting glass fibers.

In optical communication systems, it is often necessary to branch a specific light component out of a main line, for example a bus line, or to feed a light signal into the main line or bus line. This requires input and/or output couplers in which a waveguide overlaps a portion of two waveguides whose end faces are disposed adjacent each other. An example of such an input/output coupler is described in United States patent application Ser. No. 804,398 filed June 7, 1977, which was issued as U.S. Pat. No. 4,164,364 and was based on German patent application No. 26 25 855. In the coupler device described in this application, the device had a planar structure in which two fibers were laterally offset relative to one another. The optical connection between the main fiber and the branching fiber, which enable light to be fed into the main fiber or branched out of the main fiber, was formed by a strip waveguide which was of a light sensitive foil member or a portion of a light sensitive layer. However, at the present time, light guide structures, which utilize light sensitive materials such as light sensitive foils exhibit some undesirable properties which include a relatively high absorption, a deficient resolution and excitation of radiation modes. All of these properties of the light sensitive foil cause attenuation losses. Therefore, such an input and/or output coupler, which utilizes a strip waveguide as part of the coupler has a relatively high insertion loss.

SUMMARY OF THE INVENTION

The present invention is directed to providing a coupler device for use with light conducting fibers to couple-out and couple-in light signals to the fibers which coupler device is easy to produce and has small insertion losses for the light signals.

The above objects are realized in a coupler device comprising at least a first, second and third optical fiber, and means for holding said fibers in a plane with the first and second fibers converging together to have a portion of each of said fibers adjacent the end faces extending in parallel side-by-side relationship with the end faces being flush, and said means for holding positioning at least the third fiber with its end face abutting against the end faces of the first and second fibers. The means for holding preferably includes grooves for each of the fibers which grooves can be formed as gaps in a layer of synthetic material deposited on a substrate surface or may be anisotropic etched grooves in a silicon disk, which grooves have preferably a depth of at least two-thirds of the diameter of the fiber.

The coupler can also include a forth fiber which is arranged relative to the third fiber in a manner similar to the arrangement of the first and second fibers so that the coupler is both an input and an output coupler regardless of the direction of propagation of the light signals therein.

In a preferred embodiment of the device, the holding means includes a first holding means for holding the first and second fibers and a second holding means for holding the third fiber or third and fourth fibers if four fibers are present. The first and second holding means are movable relative to each other so that the degree of overlap of the third fiber with the first and second fibers is changeable to enable changing the coupler from a direct coupler between one of said first and second fibers and said third fiber to a branch coupling of the first and second fibers with the third fiber.

The coupler of the present invention thus relates to an offset structure such as disclosed in the above mentioned U.S. patent application. However, the coupler of the present invention avoids the strip waveguides and the disadvantages connected therewith.

The advantages of the proposed coupler, among other things, are as follows. The proposed coupler can be produced photolithographically in a planar technique. A particular advantage consists in the fact that the coupler device can also be produced easiy by non-photolithographic processes. Since the presently known light sensitive synthetic materials will deteriorate with age, methods of production of the coupler using non-photolithographic processes are desirable.

Moreover, the coupling device can have the output coupled-continuous capacity ratios controlled with the aid of the embodiment of the present invention so that the fiber pairs are displaced relative to one another in a determined manner. This possibility of control is significant for optimizing data-bus networks because the lateral offset can be cancelled in those couplers which are currently transmitting and receiving light. Thus, the entire attenuation of the path of a group of couplers can be diminished.

BRIEF DESCRIPTION OF THE DRAWINGS

FIG. 2 is a graph illustrating transmission and losses relative to the amount of offset.

DESCRIPTION OF THE PREFERRED EMBODIMENTS

Figure 1:
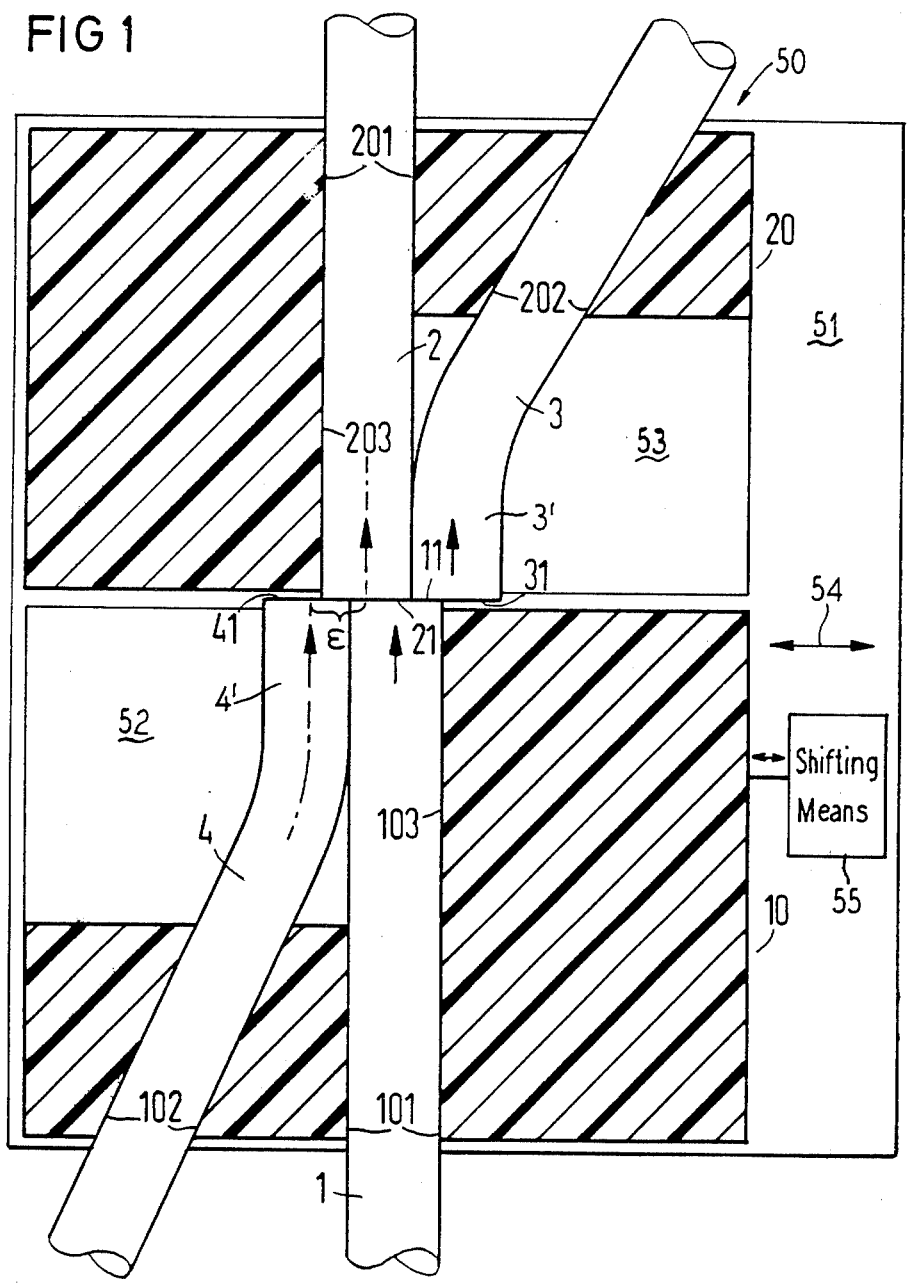
FIG. 1 is a cross-sectional view with portions in elevation for purposes of illustration of a coupler in accordance with the present invention.

The principles of the present invention are particularly useful in a coupler generally indicated at 50 in FIG. 1. As illustrated, the coupler 50 has a base 51 which supports two holders 10 and 20. As illustrated, the holder 10 comprises a layer of synthetic material disposed on a flat planar surface of a substrate or member 52 and the holder 20 includes a layer of synthetic material disposed on a flat surface of a substrate or member 53. The holder or support 10 has a groove 101 for a glass fiber 1 and a groove 102 for a glass fiber 4. In a similar manner, the holder 20 has a groove 201 for a glass fiber 2 and groove 202 for the fiber 3. As illustrated, the grooves 101 and 201 are straight grooves and parallel to each other whereas the groove 102 converge toward the groove 101 and the groove 202 converges toward the groove 201.

The glass fibers 1–4 are preferably multi-mode glass fibers and are positioned in their respective grooves and holders 10 and 20 so that the end faces 11 and 41 of the fibers 1 and 4 fall in the same vertical plane and the end faces 21 and 31 for the fibers 2 and 3 are in the same vertical plane. Due to the construction of the grooves, the fiber 4 converges toward the fiber 1 when placed in the holder with the end portion 4' being in contact with the fiber 1 and extending parallel thereto. In a similar manner, an end portion 3' of the fiber 3 also extends parallel to the fiber 2 and is contacted therewith. As illustrated, the fibers 4 and 3 each extend beyond the end of their respective grooves 102 and 202 and are urged or biased into contact with the other fiber 1 and 2, respectively, by their own elasticity. Due to the force of the bent fibers 4, the fiber 1 is supported by or held against a stop 103, which is an extension of the wall of the groove 101. In a similar manner, the fiber 2 is supported by or held against a stop 203 which is an extension of the groove 201.

As can be seen in FIG. 1, only four guide grooves 101, 102, 201, 203 for the four fibers are essentially produced to form the coupling device. These grooves can be manufactured in a photosensitive material disposed on the substrate by a photolithographic manufacturing process such as disclosed in the above mentioned U.S. application.

As illustrated in FIG. 1, the supports 10 and 20 and their substrates 52 and 53, respectively, are mounted on the base 50 so that one of the supports 10 and its substrate 52 can be moved laterally as indicated by the double arrow 54 relative to the other support 20 and its substrate 53 by a shifting means 55. Thus, by shifting the support 10, an amount of offset $\epsilon$ between the fibers can be adjusted.

The structure of the holding means which is illustrated is formed by the material of the holders 10 and 20, can be designed to eliminate using synthetic material for the guide grooves 102 and 202. This facilitates the insertion of the fibers 3 and 4 so that the previously inserted fibers 1 and 2 serve as lateral stop means. In order that an adhesive may not press apart the fibers 2 and 3 or the fibers 1 and 4, the fibers 3 and 4, for example, are pressed against the fibers 2 and 1, respectively, by means of a fiber running perpendicular to the respective axis of the fibers 3 and 4. During insertion, all the fibers can be aligned to one another simultaneously by four manipulators.

The guide grooves or trenches such as 101 and 102 can also be produced in silicon disks by means of anisotropic etching, which is also known as preferred etching. Thus, the width of each of the trenches or grooves is adapted to the diameter of the fiber by utilizing suitable etching masks. Preferably, the depth of the trenches or grooves is approximately two-thirds of the diameter of the fiber.

Besides the advantages already mentioned above, the proposed coupling has the advantage that substrates whose index of refraction has to be smaller than that of the waveguide do not have to be used as in the case with synthetic waveguides.

FIG. 2 illustrates theoretical values for transmission of a light signal in percent in relation to the amount of offset in $\mu m$ between the fibers 1 and 2. Curve $T_{1\rightarrow 2}$ shows the transmission from the fiber 1 to the fiber 2. The transmission from the fiber 1 to the fiber 3 is shown by the curve $T_{1\rightarrow 3}$. A curve L represents the total loss as a function of offset. Each of these curves is for typical fibers which have a diameter of 100 $\mu m$ and a cladding thickness of 5 $\mu m$. Although these values caused by packing-density losses are a few percentage points worse in comparison with the corresponding theoretical values of the coupling device in the above mentioned U.S. application, the values for the transmission and total losses measured in the proposed coupler device are better. If the end surface of the fibers are optimal, the theoretical expected values are obtained when the proposed coupler uses suitable adhesives on the abutting surfaces.

In the embodiment in which the holders 10 and 20 are moved relative to each other such as by the shifting means 55, the output coupled continuous capacity ratio can be controlled by means of shifting the holders. As already mentioned, this can be achieved in that the two support halves 10 and 20 are displaced relative to one another such as by operation of a shifting means which can be an electromagnetic device.

Thus, the offset $\epsilon$ between the fibers such as 1 and 2 can be cancelled when the device 50 is not required to act as a branching coupler. This is particularly advantageous in systems where a plurality of subscribers are connected to a main line and wherein the number of disconnected terminals is steady because then the path attenuation, for example in a data-bus in T-structure, can be kept as low as possible. Thus, when there is no need to couple a signal into or out of the main line, the shifting means 55 is actuated to shift the fiber 1 into axial alignment with the fiber 2.

Although various minor modifications may be suggested by those versed in the art, it should be understood that I wish to embody within the scope of the patent granted hereon, all such modifications as reasonably and properly come within the scope of my contribution to the art.

I claim:

1. A coupler for use with light conducting fibers to couple-out and couple-in a light signal to the fibers, said coupler comprising at least first, second and third optical fibers; and first and second means for holding said fibers in a plane, said first means having first and second guide channels extending toward each other in a carrier body and not merging, said first means having a stop surface adjacent an end of the first guide channel and aligned with a side thereof, said first and second fibers being disposed in said channels with an end portion extending therefrom and the first and second fibers converging together with the second fiber holding the first fiber against said stop surface with the first fiber being straight and to have a portion of ech of said fibers adjacent the end faces extending in axis parallel side-by-side relationship due to the elastic fiber deformation and with the end faces being flush, and said second means for holding at least having a carrier body with a third guide channel for the third fiber, said third fiber being disposed in the guide channel with its end face at least partially opposite the end faces of the first and second fibers, each of said guide channels being a groove in a surface of the respective carrier body.

2. A coupler according to claim 1, wherein each of of the grooves is formed as a gap in a synthetic layer which is disposed on a plane surface of each of said carrier bodies.

3. A coupler according to claim 2, wherein each groove has a depth of approximately two-thirds of the diameter of the fibers.

4. A coupler according to claim 1, wherein each of the carrier bodies is a silicon body and said grooves are isotropic etching grooves in a surface of the silicon bodies.

5. A coupler according to claim 4, wherein the depth of the grooves is approximately two-thirds of the diameter of the fiber.

6. A coupler according to claim 1, which includes means for moving said first and second holding means relative to each other so that the degree of overlap of the third fiber with the first and second fibers is changeable to enable changing the coupler from a direct coupler between one of said first and second fibers and said third fiber to a branch coupling of the first and second fibers with the third fiber.

7. A coupler according to claim 1, which further includes a fourth fiber, said second means for holding having a second stop surface adjacent an end of the groove for the third fiber and a guide groove for the fourth fiber extending toward the groove for the third fiber and not merging therewith, said third and fourth fibers being disposed in said grooves with end portions extending therefrom and the fourth fiber converging toward the third fiber to hold the third fiber against the second stop surface and having a portion thereof adjacent the end face extending in axis parallel side-by-side relationship due to the elastic deformation of the fourth fiber and the end face of the fourth fiber being flush with the end face of the third fiber.

8. A coupler according to claim 7, which includes means for moving said first and second holding means relative to each other so that the degree of overlap of the third fiber with the first and second fibers is changeable to enable changing the coupler from a direct coupler to a branch coupler.

9. A coupler according to claim 7, wherein the second stop surface is aligned with a side of the groove for the third fiber so that both the first and third fibers are straight when held against the respective stop surfaces by the second and fourth fibers.

* * * * *